(12) United States Patent
Felten et al.

(10) Patent No.: US 8,033,463 B2
(45) Date of Patent: Oct. 11, 2011

(54) SYSTEM AND METHOD FOR MACHINE-ASSISTED ELECTION AUDITING

(75) Inventors: Edward W. Felten, Princeton, NJ (US); Joseph A. Calendrino, Ashburn, VA (US); J. Alex Halderman, Princeton, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 1103 days.

(21) Appl. No.: 11/833,955

(22) Filed: Aug. 3, 2007

(65) Prior Publication Data

US 2009/0037260 A1    Feb. 5, 2009

Related U.S. Application Data

(60) Provisional application No. 60/952,960, filed on Jul. 31, 2007.

(51) Int. Cl.
*G06K 17/00*    (2006.01)
*G06K 13/00*    (2006.01)
(52) U.S. Cl. ..................................................... 235/386
(58) Field of Classification Search .................. 235/386; 705/12
See application file for complete search history.

(56) References Cited

U.S. PATENT DOCUMENTS

| | | |
|---|---|---|
| 2004/0195323 A1 | 10/2004 | Vadura et al. |
| 2005/0247783 A1 | 11/2005 | Poulos et al. |
| 2006/0041516 A1 | 2/2006 | Bogasky et al. |
| 2007/0007341 A1 | 1/2007 | Poulin et al. |

OTHER PUBLICATIONS

Neff, C. A., "Election confidence: A comparison of methodologies and their relative effectiveness at achieving it," Dec. 2003.
Johnson, K. C., "Election certification by statistical audit of voter verified paper ballots," Oct. 2004.

*Primary Examiner* — Thien M. Le
*Assistant Examiner* — Christopher Stanford
(74) *Attorney, Agent, or Firm* — 24IP Law Group; Timothy R. DeWitt (57) ABSTRACT

A method for auditing ballots cast in an election, wherein each ballot is associated with a group. A subset of groups from which sample ballots will be chosen is identified. An identifier is printed on each ballot in the subset. Each ballot has a different identifier than every other ballot in its group. A check is performed to determine whether the identifiers were printed correctly on the ballots. If so, a machine re-count of ballots in each group in the subset is performed and the results are compared to the initial tally of ballots associated with the group. If there is a mismatch, a further investigation is triggered. If there is a match, manual verification is performed on sample ballots from each group. The audit may begin prior to completion of voting from all precincts by estimating the number of samples that will be necessary.

10 Claims, 3 Drawing Sheets

SYSTEM AND METHOD FOR MACHINE-ASSISTED ELECTION AUDITING

CROSS-REFERENCE TO RELATED APPLICATIONS

The present application claims the benefit of the filing date of U.S. Provisional Patent Application Ser. No. 60/952,960 entitled "System and Method for Machine-Assisted Election Auditing" and filed on Jul. 31, 2007, by Inventors Edward W. Felten, Joseph A. Calandrino, and J. Alex Halderman.

STATEMENT REGARDING FEDERALLY SPONSORED RESEARCH OR DEVELOPMENT

This work was supported by Department of Homeland Security Award No. DE-AC05-060R23100 and National Science Foundation Fellowship 2004016343.

BACKGROUND OF THE INVENTION

1. Field of the Invention

The present invention relates to the field of election auditing.

2. Brief Description of the Related Art

Security analyses of computerized voting systems, including DREs and optical scan machines, have exposed numerous vulnerabilities that could compromise the integrity of elections performed using these devices. See Kohno, T., Stubblefield, A., Rubin, A., and Wallach, D., "Analysis of an electronic voting system," *Proc.* 2004 *IEEE Symposium on Security and Privacy*, pp. 27-42; Feldman, A., Halderman, J. A., and Felten, E., "Security analysis of the Diebold AccuvoteTS voting machine," *Proc.* 2007 *USENIX/ACCURATE Electronic Voting Technology Workshop (EVT '07)*. One proposed defense against such attacks is to produce voter-verified paper records and audit them to ensure that they support the totals claimed by the machines.

The most common auditing method is the precinct-based audit, in which workers count all paper ballots from selected precincts and compare the results to the reported precinct tallies. See Appel, A. W., "Effective audit policy for voter verified paper ballots in New Jersey," February 2007; Rivest, R. L., "On estimating the size of a statistical audit," November 2006; Rivest, R. L., "On auditing elections when precincts have different sizes," April 2007; Saltman, R. G., "Effective use of computing technology in vote tallying," Tech. Rep. NBSIR 75687, National Bureau of Standards, March 1975. Unfortunately, performing precinct-based audits can require considerable time, labor, and expense. These costs are multiplied by the complexity of the ballots in many elections, which may include dozens of contests. In a trial recount of a DRE paper trail performed in Cobb County, Ga., workers took an average of 5 minutes per ballot to audit 976 votes at a total cost of nearly $3,000. Dunn, S., "Voter verifiable paper audit trail pilot project," Cobb County, Georgia, November 2006. Unless efficiency can be improved, performing a similar recount of 3% of precincts in New Jersey could cost more than $200,000. Slow, expensive manual recounts limit the level of confidence that can be achieved within a fixed election budget, and they may delay the detection of errors until well after election results have been announced and losing candidates have conceded.

Statistical "ballot-based" audits are an alternative to manually recounting every ballot from selected precincts. Workers sample from all the paper ballots in all precincts and use the sample to assess the accuracy of the original count. Ballot-based audits tend to be more efficient than traditional precinct-based audits, since fewer ballots need to be recounted to achieve the same level of confidence in the result. Neff, C. A., "Election confidence: A comparison of methodologies and their relative effectiveness at achieving it," December 2003. For example, in a statewide race in New Jersey, fewer than one ballot per precinct (4,599 ballots total) would need to be sampled to achieve 99% confidence that the outcome had not been shifted by more than 0.2%. By contrast, over 150,000 ballots (6.9% of precincts) would need to be recounted using standard precinct-based audits (e.g., Stanislevic, H., "Random auditing of voting systems: How much is enough?," August 2006) to achieve the same confidence.

Neff and Johnson were among the first to propose combining ballot-based audit techniques with electronic voting. See Johnson, K. C., "Election certification by statistical audit of voter verified paper ballots," October 2004. Neff assumes that the voting machines link each paper ballot to its electronic counterpart using, for example, a unique identifier printed on the paper ballot and stored with the electronic ballot. When voting is complete, each precinct commits to its set of electronic ballots, then demonstrates that the paper ballots in a given random sample match the corresponding electronic ballots.

The primary weakness of this method is that it establishes the link between electronic and paper ballots at the time that votes are cast. This raises problematic voter privacy issues. For example, if the ballots are linked using sequentially increasing serial numbers, observers could correlate votes with the order in which they were cast, which can reveal the identity of voters. While a cryptographic link might protect privacy, opaque, random-looking identifiers printed on ballots may provide covert channels for leaking voter identities. Even if used securely, they might aid malicious parties who seek to intimidate voters by undermining their confidence in the secrecy of the ballot. Our audit strategy postpones linking paper and electronic records until the recount phase, which allows it to achieve equivalent confidence without jeopardizing privacy or resorting to cryptography.

Johnson alternatively proposes delaying both vote tallying and serial number printing until after all ballots are submitted, allowing voting machines to be simple, memory-less ballot printers. Voters submit their ballots, which, once polls close, are randomized and scanned/tallied. The tallying machine is therefore able to print serial numbers while scanning without privacy risk. Unlike Johnson, we assume that the voting machines maintain an electronic tally, which helps deter traditional attacks against paper-based voting, such as ballot-box stuffing, and, as we will show, provides opportunities for improving the efficiency of the audit.

SUMMARY OF THE INVENTION

The present invention incorporates an alternative audit strategy that substantially reduces these costs by using specialized machines to automate most of the work of recounting paper ballots followed by a manual audit of the machine results. The problem with machines, of course, is that the ones used for the recount are not necessarily more trustworthy than the ones used in the initial count. They may be useful for catching inadvertent errors (especially if they use a different technology and independently developed software), but a determined attacker could still target both sets of machines. What we desire is software independence—an assurance that any tampering with the machines will not cause undetected changes to the election outcome. See Rivest, R. L., and Wack, J. P., "On the notion of 'software independence' in voting systems," July 2006. To achieve this, we pair recount machines with efficient statistical auditing techniques that allow humans to confirm that the election outcome is correct.

In a preferred embodiment of the present invention a novel audit approach is used wherein ballots are recounted using recounting machines, and their output is manually audited by humans using ballot-based auditing techniques. The efficiency of the method of a preferred embodiment of the present invention is evaluated using data from Virginia's November 2006 elections, and we find that it enjoys significant gains compared to the traditional precinct-based approach. In other embodiments of the present invention, several extensions used to address practical considerations and to further improve efficiency, including means of using knowledge of ballot contents to reduce the sample size.

In a preferred embodiment, the present invention is a method for auditing ballots in an election. Each ballot is associated with a voting machine and with one of a plurality of groups of ballots. The group may be, for example, all ballots from a particular precinct or all ballots from one voting machine. Other groupings of ballots may be used as well. Each group of ballots has an associated initial ballot tally, and each group comprises all ballots associated with at least one voting machine. The method comprises the steps of identifying a subset of groups from which a plurality of sample ballots will be chosen, wherein the subset comprises fewer that all of the groups, printing an identifier on each ballot in each group of ballots in the subset of groups, wherein each ballot in each group has a different identifier than every other ballot in that group, performing a machine re-count of ballots in a group of ballots in the subset, comparing the results of the machine re-count to the initial tally of ballots associated with the group; and flagging the group as containing an error if the machine re-count for the group does not equal the initial tally associated with the group. The steps do not need to be performed in the above-referenced order, and other sequences of the steps will be apparent to those of skill in the art. The method may further comprise the step of determining whether the identifiers were printed correctly on the ballots. Each group may comprise, for example, all ballots associated with one particular voting machine. The method may further comprise the step of identifying a plurality of the groups of ballots from each of which at least one ballot will be selected for manual verification, selecting a plurality of ballots for manual verification and/or performing manual verification of a plurality of ballots. In a preferred embodiment, the identifier is a serial number, but other types of identifiers may be used.

In another embodiment of the invention, the step of identifying a subset of the plurality of the groups is performed before all voting precincts have reported their votes. The step of identifying a subset of the plurality of groups may comprise the steps of estimating a proportion of ballots associated with previously reported groups to a number of total anticipated ballots cast, estimating a minimum number of sample ballots for verification, selecting a plurality of preliminary sample ballots from the previously reported groups wherein the number of preliminary sample ballots selected is greater than or equal to the product of the estimated proportion of ballots and the estimated minimum number of sample ballots, and identifying all of the previously reported groups of ballots having at least one of the preliminary sample ballots.

In other embodiments, the method may further comprise the steps of computing a true minimum number of sample ballots after completion of reporting from all groups, randomly selecting from all ballots a number of sample ballots equal to the true minimum number of sample ballots, comparing how many of the randomly selected sample ballots are associated with the previously reported groups with the number of preliminary sample ballots. If the number of randomly selected sample ballots associated with the previously reported groups is greater than the number of preliminary sample ballots, randomly selecting from the previously reported groups an additional number of sample ballots equaling a difference between the number of randomly selected sample ballots associated with the previously reported groups and the number of preliminary sample ballots. If the number of randomly selected sample ballots associated with the previously reported groups is less than or equal to the number of preliminary sample ballots, performing no further verifications in the previously reported groups.

In another embodiment, the present invention is a method for performing a vote audit comprising the steps of estimating a proportion of ballots associated with previously reported groups to a number of total anticipated ballots cast, estimating a minimum number of sample ballots for verification, selecting a plurality of preliminary sample ballots from the previously reported groups wherein the number of the preliminary sample ballots selected is greater than or equal to the product of the estimated proportion of ballots and the estimated minimum number of sample ballots, identifying all of the previously reported groups of ballots having at least one of the preliminary sample ballots, performing vote verification in each identified previously reported group, computing a true minimum number of sample ballots after completion of reporting from all groups, randomly selecting from all ballots a number of sample ballots equal to the true minimum number of sample ballots, and comparing how many of the randomly selected sample ballots are associated with the previously reported groups with the number of preliminary sample ballots. If the number of randomly selected sample ballots associated with the previously reported groups is greater than the number of preliminary sample ballots, randomly selecting from the previously reported groups an additional number of sample ballots equaling a difference between the number of randomly selected sample ballots associated with the previously reported groups and the number of preliminary sample ballots. If the number of randomly selected sample ballots associated with the previously reported groups is less than or equal to the number of preliminary sample ballots, performing no further verifications in the previously reported groups. The step of performing a vote verification in each identified previously reported group comprising the steps of performing a machine re-count of ballots associated with each identified previously reported group and performing manual verification of each preliminary sample ballot associated with each identified previously reported group. The step of randomly selecting ballots comprising randomly selecting each ballot with equal probability or randomly selecting ballots with weighted probabilities. In another embodiment, the step of estimating a minimum number of sample ballots for verification may based upon an expected number of switched ballots necessary to change the outcome of an election.

In still another embodiment, the present invention is a method for performing a vote audit of ballots in an election comprising the steps of calculating a minimum number of sample ballots for verification based upon the number of the ballots and the contents of the ballots, selecting sample ballots for verification based upon the contents of the ballots, performing verifications of the sample ballots.

In another embodiment, the present invention is a system for performing a vote audit that comprises means for identifying a subset of groups from which a plurality of sample ballots will be chosen, wherein the subset comprises fewer than all of the groups, means for printing an identifier on each ballot in each group of ballots in the subset of groups, wherein each ballot in each group has a different identifier than every other ballot in that group, mean for performing a machine re-count of ballots in a group of ballots in the subset, means for comparing the results of the machine re-count to the initial tally of ballots associated with the group; and means for flagging the group as containing an error if the machine re-count for the group does not equal the initial tally associated with the group.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1:
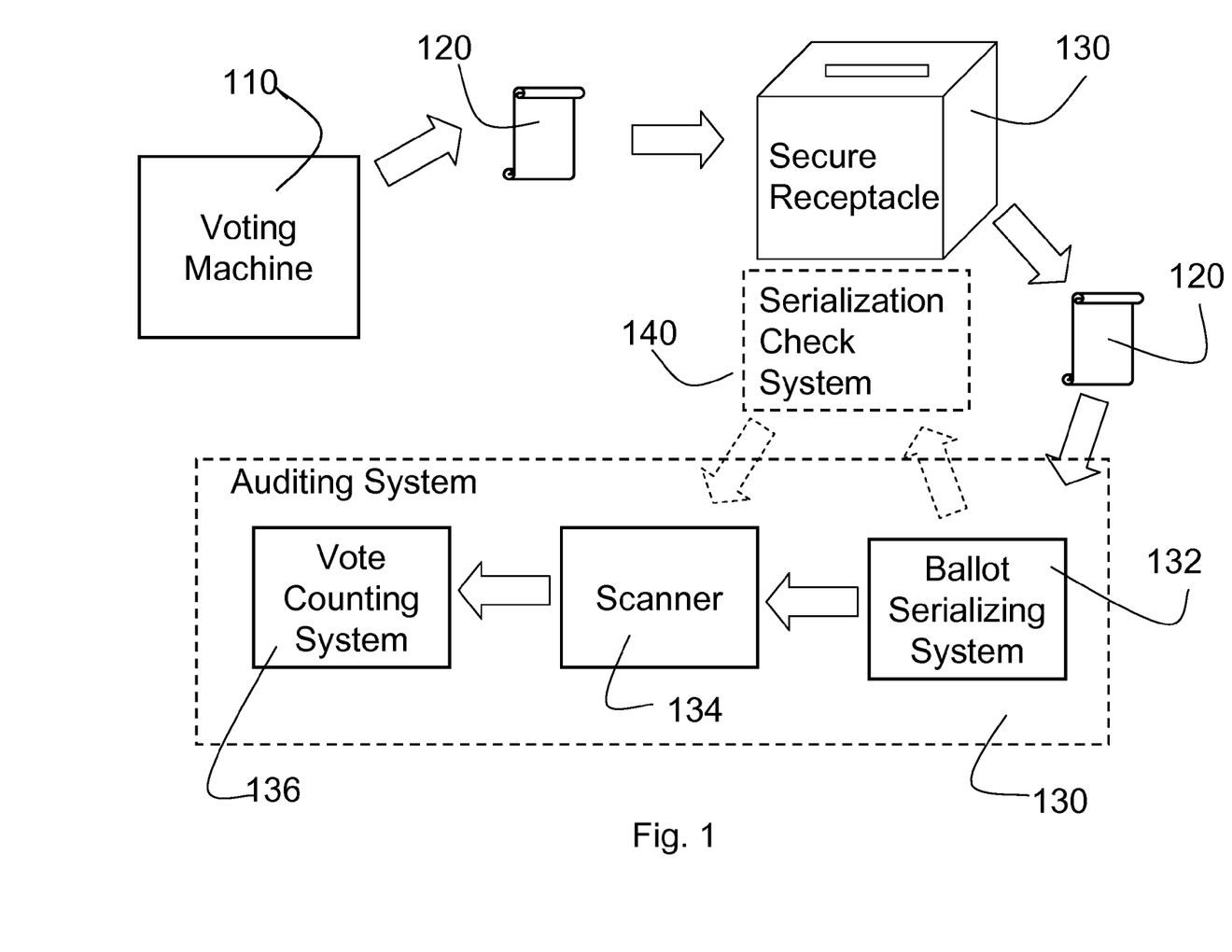
FIG. 1 is a block diagram of a vote auditing system in accordance with a preferred embodiment of the present invention.

In a preferred embodiment of the present invention, manual precinct-based audits are replaced with machine-assisted audits. As shown in FIG. 1, voters cast votes at a voting machine 110. The voting machine may be of any type, electronic or otherwise. When a vote is cast, a hard copy record 120 of the vote is generated, by hand or by the voting machine. For privacy reasons, the hard copy record preferably does not have any information, or has as little information as possible, that could be used to associate that ballot with a particular voter. The hard copy record 120 is placed into a secure receptacle 130. When a re-count or audit of the votes is to be performed, the hard copy records are fed into a re-count or auditing machine 130. The vote auditing machine may have, for example, a ballot serializing system 132 for assigning and printing identifiers on the hard copy records, a scanner 134 for scanning the hard copy records, and a vote counting system for counting the votes on the scanned ballots. As discussed below, a serialization or identifier check preferably is performed manually, but alternate embodiments with an electronic checking system 140 also are possible with the present invention. When a recount of a group of votes is to be performed, poll workers, rather than recounting ballots manually, feed them through a specialized recount or auditing machine 130 that functions like a combined optical scanner 134, printer or ballot serializing system 132, and vote counting system 136.

Figure 2:
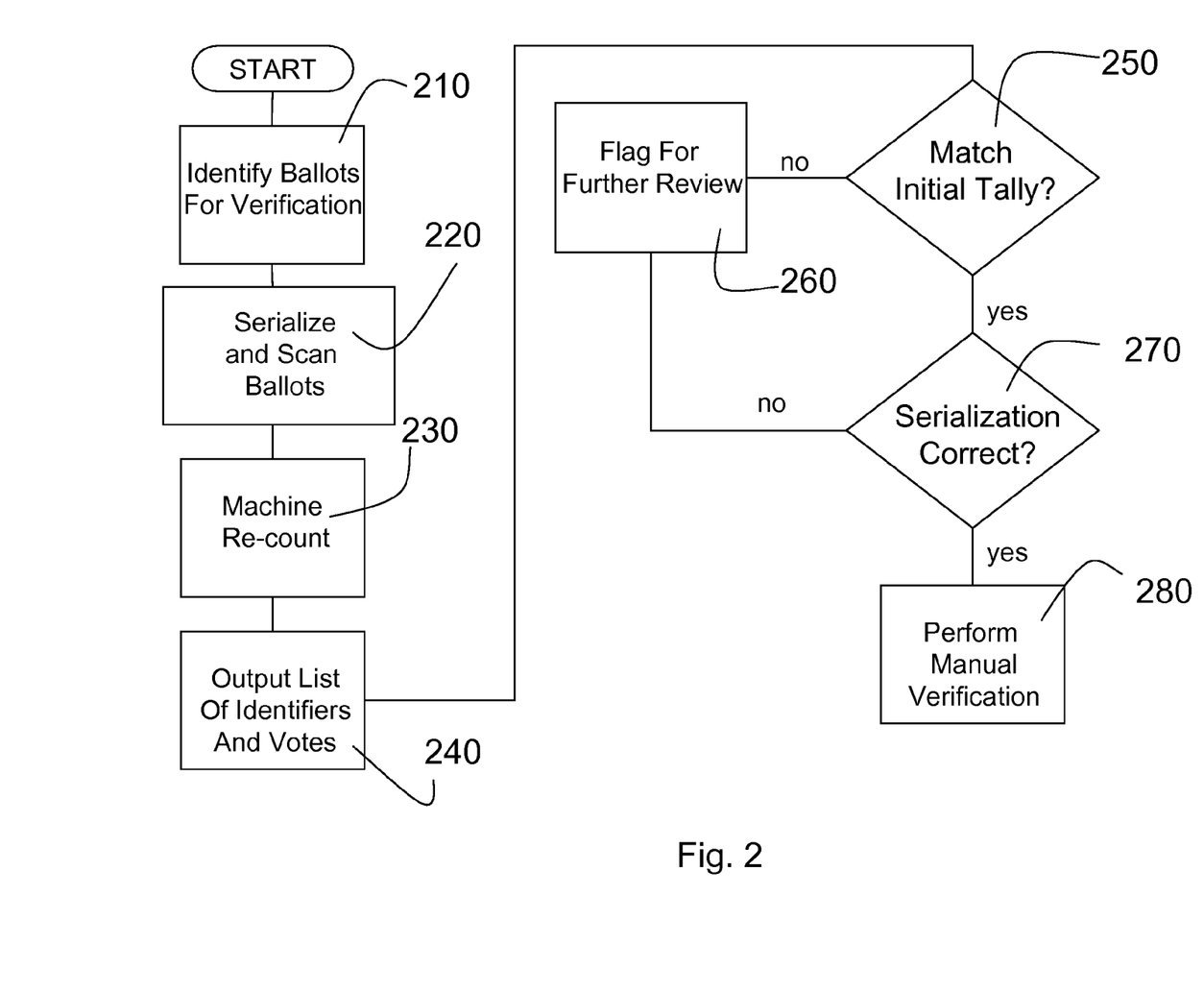
FIG. 2 is a flow diagram of an overview of a preferred embodiment of a method in accordance with the present invention.

In a preferred embodiment of the method of the present invention will be described with reference to FIG. 2. After a group of ballots is identified for a re-count at step 210, the auditing machine 130 scans the contents of each ballot and prints an identifier on the each ballot 220 and stores the identifier along with the associated ballot contents. The identifier may be a unique serial number or may be any other identifier that permits each ballot to be distinguished from other ballots in a similar group. For example, each ballot from one particular precinct could receive and identifier that distinguishes it from all other ballots from that particular precinct. In this example, the identifiers do not need to be different than identifiers assigned to ballots from other precincts. Similarly, each ballot from one voting machine could contain an identifier that distinguishes the ballot from all other ballots from that particular voting machine. In other words, the identifier may be truly unique or may just be unique within a particular group of ballots, such as all ballots from one precinct or all ballots from one voting machine. The present invention may be used with other groupings of ballots and such other groupings will be apparent to those of skill in the art.

At the end of the scanning process, the machine re-counts the votes 230 and outputs a list of votes on each ballot together with the ballot's identifier 240. While this is referred to in FIG. 2 as serializing, it should be understood that identifiers other than serial numbers may be used. The results of the re-count are compared to the initial tally of votes 250. If the re-count tallies differ from the initially reported electronic count, discrepancies clearly exist and a wider investigation should be conducted 260. Depending on circumstances, an appropriate response might be to inspect the corresponding machines, other machines of the same model, other ballots in that precinct, etc. Other responses will be apparent those of skill in the art.

If both tallies match, the workers perform a secondary audit 270 to check the accuracy of the machine's recount. For example, with sequential serial numbers they may first quickly flip through the pile of numbered ballots to ensure that it increases sequentially from one to the reported ballot total without repeats. This check helps protect against collusion between voting and recount machines, as described shortly. Other means for ensuring that the number of paper and electronic ballots match may be used, such as an electronic check of the identifiers. If the check reveals some type of inaccuracy, the group of ballots are flagged for further investigation 260. If the check confirms the identifiers have been printed (and/or assigned) accurately, a manual verification is performed 280. For example, poll workers may take a random sample of the electronic ballot records, retrieve the corresponding paper ballots, and verify that they match.

In a preferred embodiment in which the identifiers are serial numbers, since the ballots are serialized and fed out of the machine in order, retrieving a particular ballot for verification requires very little effort. The most significant labor required may be to check for repeats, which given sequential ordering, is a rapid single-pass process.

In practice, separate devices may be used to perform the printing and scanning functions of the recount machine. When voting is complete, a printer device could place serial numbers on the ballots, and then a separate scanner could read the numbers along with the votes. In precincts utilizing optical scan machines, properly designed machines could perform both the initial count and the recount: this option decreases costs but reduces redundancy. If the same machine performs counts, recounts, and printing, officials must have some means of mechanically disabling the printer while polls are open, such as removal of the printer head. Printers also must be physically unable to alter the record of the vote on the ballot. They could be designed so that they cannot reach outside of a predefined empty margin on ballots, or they could utilize a kind of ink that would be immediately apparent when ballots were inspected.

Figure 3:
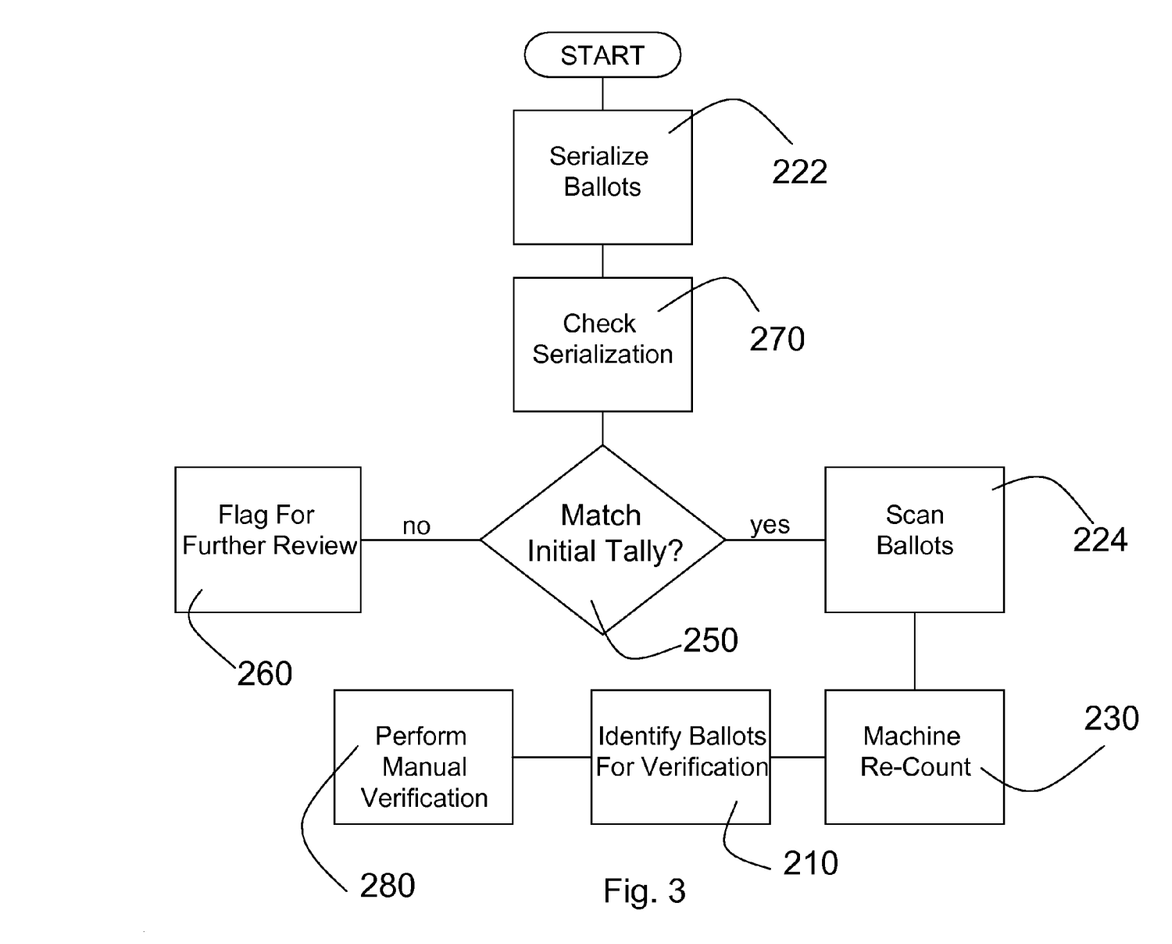
FIG. 3 is a flow diagram of an overview of an alternate preferred embodiment of a method in accordance with the present invention.

Further, various steps in the method may be performed in other sequences or may be split into multiple steps, such as serialization 222 and scanning 224 of ballots, as shown in FIG. 3. Other variations in the sequence of steps will be apparent to those of ordinary skill in the art.

Security

The redundancy of combining electronic and paper-based systems increases the security of the overall system. With high probability, the manual audit process detects any discrepancies between the sets of electronic and paper ballots that are substantial enough to impact the election's outcome. Because the process checks the correspondence between the sets of ballots, measures improving the integrity of either set increase the overall integrity of the election result. Since both the electronic and paper ballot sets must remain similar for a discrepancy to avoid detection, combined systems are more likely to detect malfunctions, and they increase the sophistication necessary to commit fraud.

For an error to go undetected, the voting machine must report an incorrect electronic tally, the recount machine must support the incorrect tally, and the manual audit process must not detect a discrepancy between the paper and electronic ballot records.

A malfunctioning or dishonest voting machine may add, subtract, or switch votes to introduce errors in its electronic tallies. If election officials maintain an accurate sign-in list for the precinct, any significant discrepancy in the total number of reported ballots and, consequently, votes will be detected. Therefore, the voting machine is limited to switching votes from one candidate to another.

For a recount machine to support an incorrect electronic tally, either the set of paper ballots must match the incorrect tally, or the machine must fail to detect a discrepancy. The set of paper ballots can only match the tally if either the voting machine printed an incorrect set of paper ballots or another party modified that set. If voters generally verify their paper ballots, the ballot box will likely contain an accurate paper ballot for most voters when polls close. While the voting machine may print additional, incorrect ballots, this would cause the number of paper ballots to exceed the electronic ballot total, which reflects the number of voters, so an accurate recount machine would detect this discrepancy. The simple, sequential nature of machine-assisted auditing also reduces opportunities for adversaries to modify paper ballots during the audit. Assuming that no adversary can modify the set of paper ballots, only recount machine malfunction, whether accidental or malicious, would allow the discrepancy to go undetected.

A malfunctioning recount machine may report incorrect electronic ballots that agree with any incorrect electronic tally regardless of the true paper ballots. The machine may even collude with other parties by omitting or printing incorrect serial numbers on paper ballots to hide errors. For example, a voting machine may print additional paper ballots with desirable votes, and a recounting machine may reuse serial numbers on certain undesirable voter-verified paper ballots to effectively replace them with the additional ballots. The manual check of serial numbers detects duplicate or omitted serial numbers and ensures that the number of paper ballots matches the total reported number of electronic ballots.

If no errors are detected before the sampling phase, we know that we have a set of electronic ballots from the recount machine that supports the initial electronic tally and an equal-sized set of paper ballots with corresponding serial numbers. We designed the sampling process specifically to detect discrepancies between these sets significant enough to affect the election's outcome. Unless an error or adversary modified both the initial electronic tally and the paper ballots, the manual audit should catch any remaining errors with a high level of confidence.

Privacy

The present invention avoids many of the privacy issues inherent in some earlier ballot-based audit methods that involve placing identifiers on ballots during the voting process. In the present invention, the ballots do not receive serial numbers or other identifiers until the recount phase, so they are likely to become at least partially reordered before being numbered. Well-designed ballot boxes and cut-and-drop paper trail systems assure that the papers are somewhat shuffled as they are inserted. Since voters widely trust these methods to frustrate correlation with voter check-in times, this provides significant practical privacy benefits. Should alternative ballot shuffling methods offer greater protection, officials may substitute such methods without modifying the audit process. In any case, the recount machine has no more information about the order of votes than would workers performing a manual recount.

Another benefit of this technique is that a voting machine need only maintain tallies rather than electronic copies of individual ballots. These tallies preferably include the total number of ballots submitted and the total number of votes for each option. Thus, voting machine designers do not need to worry about properly shuffling electronic ballots to protect voter privacy or about maintaining storage for those ballots. However, if the same machines perform counts and recounts, which may be the case with the present invention, they must have some means of attaching extra memory during the recount for storing the ballot scan results.

What to Audit

Due to the popularity of plurality voting systems in the U.S. we consider those systems in the preferred embodiments, though machine-assisted audits may be useful in many other voting systems. With plurality voting, voters may choose a number of candidates equal to the number of seats available. (This is a mild misuse of the term plurality system: other forms of plurality voting for multiple candidates exist. See Ace Electoral Knowledge Network, Plurality/majority systems, 2006. http://aceproject.org/aceen/topics/es/esd/esd01/ .) If k seats are available, voters may select up to k candidates, and candidates receiving the top k vote totals are the victors. This definition is an extension of the familiar single-seat contest.

An audit process need only sample enough ballots to confidently detect the minimum amount of fraud that would have affected the election's outcome. To modify the fewest ballots while changing the outcome, an adversary would swap the positions of the losing candidate with the most votes and the victor with fewest votes. Switching votes directly between these candidates requires the fewest ballot changes, as each switch alters the relative difference by two. To do so, the adversary would take ballots with votes for candidate A but not B and change them to contain votes for B but not A. Therefore, we need only audit enough ballots to discover fraud that alters a number of ballots equal to half the difference (rounded up) in vote totals between the "just losing" and "just winning" candidates.

Two techniques are described for selecting which ballots and precincts need to be audited. The first technique has the benefit of a constant sample size given the number of ballots, the margin of victory, and the desired level of confidence. Sample size may vary with the second approach, but that approach is more amenable to extensions of the present invention discussed below.

Constant Sample Size Method

The hypergeometric distribution describes the number of bad ballots an auditor can expect to find when sampling without replacement. Assume that auditors desire a confidence level c that no fraud significant enough to change the election's outcome occurred. Given N total ballots and a minimum of B incorrect ballots, the probability mass function of the hypergeometric distribution dictates a minimum sample size, n, of:

$$n = \min\left\{ u \,\middle|\, 1 - \prod_{k=0}^{u-1} \frac{N-B-k}{N-k} \geq c \right\} \quad (1)$$

A simple computer program can rapidly, verifiably calculate n for any practical value of N.

After all precincts report their recount results and scanned ballots, state officials randomly select n ballots to check. To do so, officials assign each ballot an equivalent portion of the range of a pseudorandom function. Since sampling occurs without replacement, the officials must alter the assignments appropriately after each draw. Representatives for all candidates or issues in a race may assist in randomly generating a key for the function (for example, consider Cordero, A., Wagner, D., And Dill, D., "The role of dice in election audits extended abstract," *IAVoSS Workshop on Trustworthy Elections* 2006). The state then evaluates the function, with the randomly generated key, for the numbers one through n.

Because officials select ballots at random with respect to any given race, officials may use the same ballot from auditing one race in auditing any other race appearing on that ballot, provided that all voters eligible to vote in the latter race are also eligible to vote in the former. This reduces the number of ballots to retrieve. Note that the correlation between votes on a given ballot prevent us from gaining additional assurance from using the same ballots for multiple races, but officials still gain confidence c in the results of each race.

A machine recount of a precinct is only necessary if a ballot will be selected for manual verification in that precinct. Thus, auditors could use the initial electronic tallies to perform a mock ballot selection before the machine recount. Any precinct which would have contained a chosen ballot given the mock selection will undergo a machine recount. Following the machine recount, representatives must generate a new key. Because a pseudorandom function is deterministic, an adversary with knowledge of the key prior to the machine recount could determine which serial numbers will be sampled for manual review following the recount. Such an adversary could collude with the recount machine to hide fraud under serial numbers that will not be sampled Officials may then randomly select a single ballot from each recounted precinct and randomly draw the remaining required ballots from the full pool in all recounted precincts.

Varying Sample Size Method

Rivest proposes an efficient precinct-based auditing technique in which, rather than drawing a given-size sample from the population of precincts, auditors instead randomly select each precinct with a given probability. The same idea is also useful in the context of ballot-based auditing. Assume that, to change the results of an election, the set of ballots must contain a minimum of B bad ballots. To achieve a confidence level of c that at least one bad ballot will be sampled, auditors may select each ballot with probability p chosen such that $(1-p)^B \leq 1-c$, or $p \geq 1-(1-c)^{1/B}$.

Officials may follow the same process as before for generating a key and may apply a pseudorandom function to a unique identifier for each ballot (for example, 1 to N, where N is the total number of ballots in all precincts voting on the given issue), mapping the result back to [0,1] to determine whether to check the ballot.

To determine which precincts need to be audited, we may calculate the probability that one or more of the $v_i$ ballots in precinct i will be sampled as $1-(1-p)^{v_i}$. Auditors may select each precinct based on the probability that it contains a sampled ballot. If so, officials perform a machine recount in that precinct. Given that at least one ballot is sampled in a precinct, the probability of sampling k ballots in that precinct is:

$$\frac{\binom{v_i}{k} p^k (1-p)^{v_i-k}}{1-(1-p)^{v_i}} \quad (2)$$

Following the machine recount, officials randomly select the precinct's sample size based on this distribution. As before, officials should generate a new key immediately following the machine recount of selected precincts.

Comparison to the Method of Rivest

Assume use of the audit method in Section 3.2, and let $p=1-(1-c)^{1/B}$. The probability that precinct i requires a machine recount is therefore $p=1-(1-c)^{v_i 1/B}$. If an adversary can steal any number of votes in a precinct without generating suspicion, Rivest proposes a logistic precinct-based approach that yields the same precinct audit probability. For machine-assisted auditing, however, auditors need only manually review a subset of the recounted ballots.

Rivest presents his logistic approach as a non-optimal heuristic, so the usefulness of this link seems limited. Furthermore, the percentage of votes in a precinct that one may steal without generating suspicion is more likely 10-20% than the 100% assumed here. In light of this, a performance comparison between Rivest's optimal precinct-based techniques and our methods under realistic circumstances would be informative.

Evaluation

To evaluate the efficiency of machine-assisted auditing (and ballot-based auditing in general) versus precinct-based auditing, we consider both techniques in the context of available data from Virginia's November 2006 elections, both for local and statewide races. In this example, we considered all races from the available Virginia data. Some local races are absent, so we ignore those. Due to minor absences in the data set, we assume that no voter submitting a ballot abstains from voting on an issue and that voters for multi-seat races submit multiple ballots rather than a single ballot with multiple selections. While these assumptions slightly affect the realism of the tests, they likely had only a minor impact on the overwhelming results.

In all cases, we seek a 99% confidence level. For machine-assisted auditing, we use the techniques discussed above. For precinct-based auditing, we use the methods and assumptions in: auditors choose precincts uniformly at random, an adversary may switch no more than a set percentage of the votes in a precinct without arousing suspicion (we use 10%), and the adversary may switch votes in the largest possible precincts Virginia contains 2,599 precincts and approximately 4.6 million registered voters, nearly 53% of whom cast ballots during the November 2006 election. The general election decided nineteen issues: four statewide issues, including a U.S. Senate race and several statewide initiatives, and fifteen smaller races, such as U.S. House races. In addition, voters considered numerous local ballot issues, ranging from city council elections to school constructions projects. Virginia State Board Of Elections, General election—Nov. 7, 2006. http://www2.sbe.virginia.gov/web docs/Election/results/2006/Nov/htm/index.htm. Because auditing is typically both more important and more labor-intensive in closer races, we focus on such races, excluding consideration of races for which modification of 10% or more of the ballots would have been necessary to change the outcome. This choice rules out many of the races but leaves a set of 49 remaining. Seven of those remaining were general election issues and forty-two were local issues.

The remaining general election issues include a U.S. Senate race with a margin of victory of 0.39%, four U.S. House races, a race for the Virginia House of Delegates, and a state constitutional amendment. For those races, machine-assisted auditing would require a manual review of approximately 437 ballots on average—0.06% of the 796,469 average total ballots. Only the smaller House of Delegates race would require review of greater than 1% of the ballots (1.05%), and five of seven races require audit rates under 0.1%. Precinct-based auditing would review approximately 177,849 ballots on average—22.33% of the average total ballots. In each case, precinct-based auditing requires an expected hand count of more than 42 times as many ballots. The closely contested U.S. Senate race would require review of 2,337 of 2,370,445 ballots with machine-assisted auditing and 1,141,900 ballots on average with precinct-based auditing.

While less overwhelming, the results for local ballot issues are highly favorable as well. In this case, machine-assisted audits would review approximately 224 ballots on average—2.28% of the 9,842 average total ballots. Precinct-based audits would require manual review of approximately 3,928 ballots on average—39.91% of the average total ballots. Only five of the forty-two races would require a manual review of more than 50% of the ballots with machine-assisted audits. In contrast, only six of the forty-two races would require a review of less than 50% of the ballots on average with precinct-based audits. Precinct-based audits would require a complete recount in more than half of the cases.

The races that are particularly difficult for machine-assisted auditing are town council, city council, and school board races with 7/492, 5/849, 12/769, 7/246, and 3/2409 margins of victory—requiring manual review of 68.3%, 78.4%, 53.4%, 68.3%, and 90.0% of ballots respectively. In each of these cases, precinct-based auditing would require a full recount.

If comparing machine-assisted audits and precinct-based audits purely on the number of manual ballot reviews, these results indicate a conclusive advantage for machine-assisted audits.

Extensions

In this section, we consider a number of methods for increasing the efficiency, practicality, and utility of machine-assisted audits.

Handling Misreadings

With some small probability, auditors might misread a paper ballot and falsely conclude that it either does or does not match the corresponding electronic ballot. Accidentally concluding that the two versions of a ballot do not match is not an issue: auditors would certainly immediately double-check any such ballots. The opposite error would be more serious. We would expect its probability to be low, however, especially in larger elections. In that case, the number of ballots to check per precinct will often be relatively small, meaning that auditors are less likely to become careless. In addition, the state may request and double-check copies of the paper ballots against the reported electronic ballots.

If auditor error is a serious risk, Johnson offers a starting point for adapting sample sizes to overcome such errors, assuming use of the ballot-based audit techniques discussed above. If officials are instead using the precinct-based methods discussed above, these errors are easy to manage. Suppose that an auditor misclassifies a mismatch as a match with probability m. In this case, the true probability of detecting a bad ballot will not be p but will instead be p(1−m). Thus, p must be chosen such that $p \geq [1-(1-c)^{1/B}]/(1-m)$.

Early Returns

A variety of circumstances may result in delayed reporting from certain precincts. Precincts that report in a timely manner might wish to begin the audit process without waiting hours or days for a complete initial tally. Given partial returns, auditors may assume reasonable or worst case scenarios from the remaining precincts and begin the audit under those assumptions. Once all precincts have reported, unexpected results might force additional sampling from previously reported precincts, but the bulk of the audit process may already be complete.

Assuming the ballot-based methods discussed above, this means that auditors could estimate both the proportion of ballots cast in previously reported precincts (q) and the necessary sample size (n'). They may then select $d \geq n'q$ ballots from the already-reported precincts. After reporting is complete, auditors could compute the true sample size, create a one-to-one mapping between all reported ballots and $\{1, \ldots, N\}$ and randomly select n values from that set. If d or fewer of the selected values correspond to ballots in previously reported precincts, no additional sampling is necessary in those precincts. If more than d values correspond to those precincts, that number minus d additional ballots must be drawn from the precincts. Similarly, auditors must select a number of ballots from the late reporters equal to the number of selected values corresponding to ballots in those precincts.

Using the precinct-based methods discussed above, auditors would calculate p' based on the expected number of switched ballots required to change the outcome and begin sampling. Once all results are reported, officials may calculate the true value of p and use it for newly reported ballots. If the final margin of victory is smaller than expected, they also must sample previously reported but unsampled ballots with probability $$p'' = 1 - \frac{1-p}{1-p'},$$

yielding an over/all selection probability of p for those ballots.

Varying Probability by Precinct

In a precinct-based method, the sampling process selects each ballot with equal probability. That process need not do so. For example, officials may prefer to reduce the probability that ballots are selected in extremely small precincts, thereby reducing the probability that machine recounts (and recount machines) will be necessary for a large number of small precincts. The only constraint that the audit process must satisfy is that, given any set of ballots of size B or larger with corresponding selection probabilities $p_1, \ldots, p_B$, $(1-p_1) \ldots (1-p_B) \leq 1-c$. Thus, auditors may entirely ignore small precincts in some cases provided that they increase the probability of sampling ballots in other precincts to compensate.

Hybrid Strategies

The line between precinct-based auditing and machine-assisted ballot-based auditing need not be so fine. States could use machines to perform recounts in randomly selected precincts then audit the machine results. The embodiment of the previous section technically does this, but the probability of selecting a precinct need not be directly based on the probability of selecting its underlying ballots. This is similar to a dial that auditors could turn. Assume a desired confidence level c. At one extreme, machines could recount all precincts, and auditors could sample ballots such that the overall probability of uncovering a bad ballot—if enough are bad to impact the outcome—is c. This is a machine-assisted ballot-based audit approach.

At the other extreme, auditors could select precincts such that the probability that at least one selected precinct contains a bad ballot—if enough are bad to impact the outcome—is c, and auditors could manually check all ballots in those precincts. This is precinct-based auditing. In either case, the probability of detecting fraud significant enough to affect the election's outcome is c. Between these two possibilities, one could trade a greater expected number of machine recounts for a smaller expected proportion of manual recounts and vice versa to achieve a confidence level of c. Depending on the costs and benefits of each, states may choose whatever balance is most appropriate for their specific circumstances.

Considering Ballot Contents

Consider a two-candidate mayoral race in which the electronic results indicate that Alice beat Bob 10,001 to 10,000. Traditional audit techniques would require that officials consider ballots containing votes for either candidate even though the primary objective is to discover whether any votes for Alice should have been for Bob. Examining only ballots reported to contain votes for Alice could cut auditor work nearly in half, as auditors seek to discover an equivalent amount of fraud in a far smaller pool of ballots. In general, by considering the contents of ballots, officials may reduce the number of manual verifications required. Note that, to apply these methods, either a full machine recount of all precincts or some other means of obtaining a full set of electronic ballots is necessary. For the remainder of this section, we assume use of the above described precinct-based audit process.

Assume a race in which n candidates are competing for k seats, and let $v_1, \ldots, v_n$ be the vote totals for the candidates in decreasing order. Therefore, $v_1, \ldots, v_k$ correspond to winning candidates. Because a single ballot may contain votes for up to k candidates, we need to consider the combination of votes on each ballot. Let $C_s$, where $1 \leq s \leq k$, be the winning candidate with the lowest vote total that received a vote on the ballot. Let $C_t$, where $k+1 \leq t \leq n$, be the losing candidate with the highest vote total that did not receive a vote on the ballot. We need to look for several possibilities:

If $C_s$ exists, we must consider the possibility that the ballot contains a fraudulently added vote for any winning candidate receiving a vote on that ballot. At least $v_s - V_{k+1}$ votes would need to be added to move such a candidate from a losing position to a winning position.

If $C_t$ exists, we must consider the possibility that the ballot contains a fraudulently removed vote for any losing candidate without a vote on that ballot. At least $v_k - v_s$ votes would need to be removed to move such a candidate from a winning position to a losing position.

If $C_s$ and $C_t$ both exist, we must consider both previous cases along with the possibility that a vote was fraudulently switched from a losing candidate without a vote on that ballot to a winning candidate receiving a vote. At least $$\left| \frac{v_s - v_t}{2} \right|$$

votes would need to be switched to swap the relative positions of two such candidates.

If neither $C_s$ nor $C_t$ exist, the ballot could not have been part of fraudulent activity that changed the election's result, so we may ignore it. Otherwise, let B equal the minimum amount of fraud necessary for any of the applicable cases above. As before, the ballot must be manually checked with probability p such that $p \geq 1-(1-c)^{1/B}$.

If ballots contain votes for more than one race, we must manually check ballots with the maximum probability necessary for any individual race/vote combination on that ballot.

Considering Initial Returns

Similar tricks may also be useful given only reported initial electronic vote tallies. A precinct in which initial tallies indicate that all ballots contain votes for Bob could not have contributed to discrepancies affecting the election's outcome, so both machine-assisted and precinct-based auditing could ignore that precinct entirely. In a single-seat race, a ballot may contain a single vote at most, so we may determine the precise ballot contents for that race from the initial electronic tallies alone and use that to calculate an appropriate probability of manually verifying each ballot.

As we increase the number of available seats, competing candidates, and races on a ballot, inferences tend to become more difficult and less beneficial. The added complexity is a result of an increase in the number of possible vote combinations on a ballot. One may still draw inferences from the ballots, however. For example, if 43% of ballots contain a vote for the "just losing" candidate, we know that 43% of the ballots could not have had a vote for that candidate removed or switched to another candidate. As vote totals in complex multi-seat races become more tightly clustered, the complication of drawing inferences might counterbalance the increasingly minor benefits of those inferences. A test of these methods on real elections data might help to better establish which cases benefit from these techniques.

Write-Ins

Machine-assisted audits can easily handle the case in which all write-in candidates are put in a machine-readable form, whether by voters or by election officials. They also may handle the case in which voters may not write-in a candidate already appearing on the ballot by treating all write-in votes as votes for a single additional candidate. Otherwise, if the number of write-in votes is insufficient to affect the outcome of the election (given initial tallies), we may assume whatever combination of write-in votes results in the closest possible election and search for the necessary quantity of fraud in ballots not containing write-in votes.

If write-in votes could change the results of the election, a count of those votes will ultimately be necessary before certification of the election. Given that the count of ballots with write-ins is manually performed, we may simply audit the remaining, machine-recounted ballots to discover any fraud large enough to affect the outcome. If write-in ballots are machine-scanned, we may add a serial number printer to that scanner and sample ballots from the full pool. Given the relatively small quantity of write-ins in many elections, we expect this to rarely be a significant issue in practice.

Machine Malfunction

Presumably, some percentage of recount machines will occasionally fail. While a failure would cause a delay in the audit process for the affected precinct, the delay would only be for that precinct. All other precincts could proceed normally, and the affected precinct could wait for repairs or obtain a recount machine from a completed precinct. If voting machines fail, the failures could delay initial tally reports from the affected precincts. As discussed above, such a delay need not hold up other precincts.

Candidate Assurance

To give candidates additional assurance that the audit process did not miss or under-sample precincts in which fraud seems apparent, Appel introduces the idea of allowing candidates to select a small number of additional precincts and pay for full manual recounts of those precincts (candidates are reimbursed if errors are uncovered). We would recommend that any practical system based on this paper allow for such an idea. Even if the possibility is unlikely, any process short of a total recount could occasionally miss fraud obvious to a human. In addition, candidates skeptical towards the audit process have an alternative route of uncovering fraud. Appel explains and motivates this idea further.

CONCLUSION

A well-designed audit process assures the public that an election's outcome is the product of voters' intentions, not fraud or voting machine flaws. By adding a novel machine-assisted recount procedure to ballot-based audits, we can enjoy the efficiency benefits of those audits while avoiding privacy concerns and retaining the security benefits of combined paper/electronic solutions. The tests using data from Virginia's November 2006 elections confirm the efficiency advantages of machine-assisted audits, and the extended techniques that we propose promise to reduce even further the number of ballots that need to be inspected by humans.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for auditing ballots cast in an election, wherein each said ballot is associated with one of a plurality of voting machines and one of a plurality of groups of said ballots wherein each said group has an associated initial ballot tally, and each said group comprises all of said ballots associated with at least one of said voting machines, the method comprising the steps of:

identifying a subset of said plurality of said groups from which a plurality of sample ballots will be chosen, wherein said subset comprises fewer than all of said groups, wherein said step of identifying a subset comprises the steps of:

estimating a proportion of ballots associated with previously reported groups to a number of total anticipated ballots cast;

estimating a minimum number of sample ballots for verification;

selecting a plurality of preliminary sample ballots from said previously reported groups wherein the number of said preliminary sample ballots selected is greater than or equal to the product of said estimated proportion of ballots and said estimated minimum number of sample ballots; and identifying all of said previously reported groups of ballots having at least one of said preliminary sample ballots;

printing an identifier on each ballot in each group of ballots in said subset of groups, wherein each ballot in each group has a different identifier than every other ballot in the same group;

performing a machine re-count of ballots in a group of ballots in said subset;

comparing results of said machine re-count to said initial tally of ballots associated with said re-counted group; and flagging said re-counted group as containing an error if said machine re-count for said re-counted group does not equal said initial tally associated with said re-counted group.

2. A method according to claim 1, further comprising the step of determining whether said identifiers were printed correctly on said ballots.

3. A method according to claim 1, wherein said re-counted group comprises all ballots associated with one particular voting machine.

4. A method according to claim 1, wherein said re-counted group comprises all ballots associated with one particular voting precinct.

5. A method according to claim 1, further comprising the step of identifying a plurality of groups of ballots in said subset from each of which at least one ballot will be selected for manual verification.

6. A method according to claim 1, further comprising the step of selecting a plurality of ballots for manual verification.

7. A method according to claim 6, further comprising the step of performing manual verification of said selected plurality of ballots.

8. A method according to claim 1, wherein said identifier comprises a serial number.

9. A method according to claim 1, wherein said step of identifying a subset of said plurality of said groups is performed before all voting precincts have reported their votes.

10. A method according to claim 1, further comprises the steps of:

computing a true minimum number of sample ballots after completion of reporting from all groups;

randomly selecting from all ballots a number of sample ballots equal to said true minimum number of sample ballots;

comparing how many of the randomly selected sample ballots are associated with said previously reported groups with said number of preliminary sample ballots;

if said number of randomly selected sample ballots associated with said previously reported groups is greater than said number of preliminary sample ballots, randomly selecting from said previously reported groups an additional number of sample ballots equaling a difference between said number of randomly selected sample ballots associated with said previously reported groups and said number of preliminary sample ballots; and if said number of randomly selected sample ballots associated with said previously reported groups is less than or equal to said number of preliminary sample ballots, performing no further verifications in said previously reported groups.

* * * * *

UNITED STATES PATENT AND TRADEMARK OFFICE
CERTIFICATE OF CORRECTION

| | | |
|---|---|---|
| PATENT NO. | : 8,033,463 B2 | Page 1 of 1 |
| APPLICATION NO. | : 11/833955 | |
| DATED | : October 11, 2011 | |
| INVENTOR(S) | : Edward W. Felten, Joseph A. Calandrino and J. Alex Halderman | |

It is certified that error appears in the above-identified patent and that said Letters Patent is hereby corrected as shown below:

ON THE TITLE PAGE:

ITEM (75) Inventors, change "Calendrino" to "Calandrino"

Signed and Sealed this

Twenty-ninth Day of November, 2011

David J. Kappos
*Director of the United States Patent and Trademark Office*